United States Patent
Nagumo et al.

(10) Patent No.: US 10,020,518 B2
(45) Date of Patent: Jul. 10, 2018

(54) FUEL CELL STACK

(71) Applicant: HONDA MOTOR CO., LTD., Tokyo (JP)

(72) Inventors: Kenji Nagumo, Wako (JP); Naoki Yamano, Wako (JP); Tsuyoshi Kobayashi, Wako (JP); Hiroaki Ota, Wako (JP); Syuji Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 14/975,855

(22) Filed: Dec. 21, 2015

(65) Prior Publication Data

US 2016/0181623 A1 Jun. 23, 2016

(30) Foreign Application Priority Data

Dec. 22, 2014 (JP) ................................. 2014-258881

(51) Int. Cl.
| | |
|---|---|
| *H01M 8/24* | (2016.01) |
| *H01M 2/02* | (2006.01) |
| *H01M 2/08* | (2006.01) |
| *H01M 2/20* | (2006.01) |
| *H01M 8/0202* | (2016.01) |
| *H01M 8/04082* | (2016.01) |
| *H01M 8/241* | (2016.01) |
| *H01M 8/2483* | (2016.01) |

(52) U.S. Cl.
CPC ..... *H01M 8/0202* (2013.01); *H01M 8/04201* (2013.01); *H01M 8/241* (2013.01); *H01M 8/2483* (2016.02); *H01M 2250/20* (2013.01); *Y02T 90/32* (2013.01)

(58) Field of Classification Search
CPC .......................... H01M 8/0273; H01M 8/0271
See application file for complete search history.

(56) References Cited

U.S. PATENT DOCUMENTS

2014/0234746 A1* 8/2014 Terada ............... H01M 8/242
429/458

FOREIGN PATENT DOCUMENTS

| JP | 09-092322 | 4/1997 |
|---|---|---|
| JP | 2005-340173 | 12/2005 |
| JP | 2008-218279 | 9/2008 |

* cited by examiner

*Primary Examiner* — Cynthia H Kelly
*Assistant Examiner* — Julian Anthony
(74) *Attorney, Agent, or Firm* — Mori & Ward, LLP

(57) ABSTRACT

A fuel cell stack includes a stacked body, a first insulator, and a first shim. The stacked body includes electrolyte-electrode assemblies and separators. The electrolyte-electrode assemblies are stacked in a stacking direction and have a first end electrolyte-electrode assembly disposed at a first end of the stacked body. The separators includes a first end separator disposed at the first end of the stacked body between the first end electrolyte-electrode assembly and a first contact end plate having a first contact surface which the first end separator contacts. The first shim is provided in a first recess between the first contact end plate and the first insulator and has a thickness such that an outer peripheral surface of the first end separator is positioned between the first contact surface of the first contact end plate and an outer peripheral surface of the first insulator in the stacking direction.

9 Claims, 6 Drawing Sheets

FUEL CELL STACK

CROSS-REFERENCE TO RELATED APPLICATIONS

The present application claims priority under 35 U.S.C. § 119 to Japanese Patent Application No. 2014-258881, filed Dec. 22, 2014, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte fuel cell includes a membrane electrode assembly (MEA), in which an anode electrode is disposed on one side of a solid-polymer electrolyte membrane and a cathode electrode is disposed on the other side of the solid-polymer electrolyte membrane. The solid-polymer electrolyte membrane is made from a polymer ion-exchange membrane. The MEA and a pair of separators, sandwiching the MEA therebetween, constitute a power generation cell. A predetermined number of such power generation cells are usually stacked and used, for example, as a vehicle fuel cell stack for a fuel cell vehicle (such as a fuel cell electric automobile).

In a fuel cell stack, the temperatures of some power generation cells tend to decrease more easily than other power generation cells due to dissipation of heat to the outside. For example, heat of a power generation cell disposed at an end of the fuel cell stack in the stacking direction (hereinafter, referred to as an "end cell") is easily dissipated through a terminal plate, an end plate, and the like, which are disposed adjacent to the end cell. Therefore, the temperature of the end cell significantly decreases. As a result, a problem arises in that retention of water may occur in the end cell and power generation performance may decrease.

An example of a fuel cell stack for solving the problem is disclosed in Japanese Unexamined Patent Application Publication No. 9-92322. The fuel cell stack includes a pair of fuel cell substacks, in each of which a plurality of fuel cell cells are stacked, and a gas-impermeable unit disposed between the pair of fuel cell substacks. The gas-impermeable unit blocks flows of a fuel gas and an oxidant gas between the fuel cell substacks.

The fuel gas and the oxidant gas each flow independently in each of the fuel cell substacks, and the flow rate of the oxidant gas has such a distribution that the flow rate is high in both end portions of the fuel cell stack and low in a central portion of the fuel cell stack. It is described that such a distribution of the flow rate of the oxidant gas cancels out the temperature distribution of the fuel cell stack, in which the temperatures of the both ends portions are high and the temperature of the central portion is low; and thereby the amounts of water held in electrolyte membranes of the fuel cells are made uniform.

SUMMARY

According to one aspect of the present invention, a fuel cell stack includes a stacked body, a first insulator, and a first shim. The stacked body has a first end and a second end opposite to the first end in a stacking direction and includes electrolyte-electrode assemblies and separators. The electrolyte-electrode assemblies are stacked in the stacking direction and have a first end electrolyte-electrode assembly disposed at the first end of the stacked body. Each of the electrolyte-electrode assemblies includes an electrolyte, a first electrode, and a second electrode. The electrolyte has a first side and a second side opposite to the first side in the stacking direction. The first electrode is disposed on the first side. The second electrode is disposed on the second side. The separators are provided so that each of the electrolyte-electrode assemblies is sandwiched between two separators among the separators in the stacking direction. The separators includes a first end separator disposed at the first end of the stacked body between the first end electrolyte-electrode assembly and a first contact end plate having a first contact surface which the first end separator contacts. The first insulator is opposed to the first contact end plate and has a first recess opposed to the first contact end plate. An outer peripheral surface of the first end separator is connected to an outer peripheral surface of the first insulator. The first shim is provided in the first recess between the first contact end plate and the first insulator and has a thickness such that the outer peripheral surface of the first end separator is positioned between the first contact surface of the first contact end plate and the outer peripheral surface of the first insulator in the stacking direction.

According to another aspect of the present invention, a fuel cell stack includes a stacked body, a first insulator, and a first shim. The stacked body has a first end and a second end opposite to the first end in a stacking direction and includes electrolyte-electrode assemblies and separators. The electrolyte-electrode assemblies are stacked in the stacking direction and have a first end electrolyte-electrode assembly disposed at the first end of the stacked body. Each of the electrolyte-electrode assemblies includes an electrolyte, a first electrode, and a second electrode. The electrolyte has a first side and a second side opposite to the first side in the stacking direction. The first electrode is disposed on the first side. The second electrode is disposed on the second side. The separators are provided so that each of the electrolyte-electrode assemblies is sandwiched between two separators among the separators in the stacking direction. The separators includes a first end separator disposed at the first end of the stacked body between the first end electrolyte-electrode assembly and a first contact end plate having a first contact surface which the first end separator contacts. The first insulator is opposed to the first contact end plate. An outer peripheral surface of the first end separator is connected to an outer peripheral surface of the first insulator. The first shim is provided between the first contact end plate and the first insulator so that the outer peripheral surface of the first end separator is positioned between the first contact surface of the first contact end plate and the outer peripheral surface of the first insulator in the stacking direction.

According to further aspect of the present invention, a fuel cell stack includes a stacked body. The stacked body has a first end and a second end opposite to the first end in a stacking direction and includes electrolyte-electrode assemblies and separators. The electrolyte-electrode assemblies are stacked in the stacking direction and have a first end electrolyte-electrode assembly disposed at the first end of the stacked body. Each of the electrolyte-electrode assemblies includes an electrolyte, a first electrode, and a second electrode. The electrolyte has a first side and a second side opposite to the first side in the stacking direction. The first electrode is disposed on the first side. The second electrode is disposed on the second side. The separators are provided so that each of the electrolyte-electrode assemblies is sandwiched between two separators among the separators in the stacking direction. The separators includes a first end separator disposed at the first end of the stacked body. A seal member and a first end seal member are provided on each of the separators and on the first end separator, respectively so that a dimension of the first end seal member is larger than a dimension of the sealing member in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
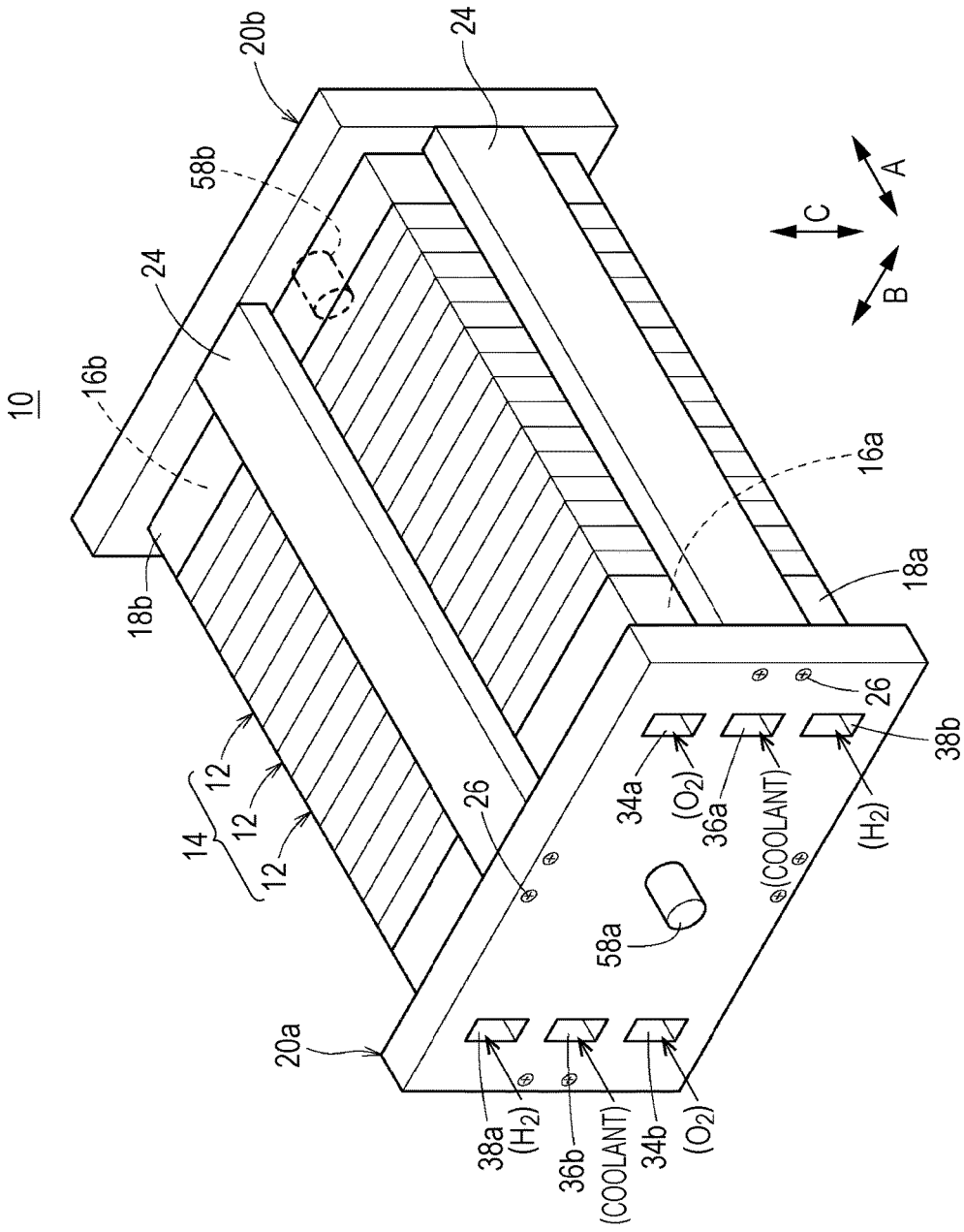
FIG. 1 is a perspective view of a fuel cell stack according to an embodiment of the present disclosure.

The embodiments will now be described with reference to the accompanying drawings, wherein like reference numerals designate corresponding or identical elements throughout the various drawings.

Figure 2:
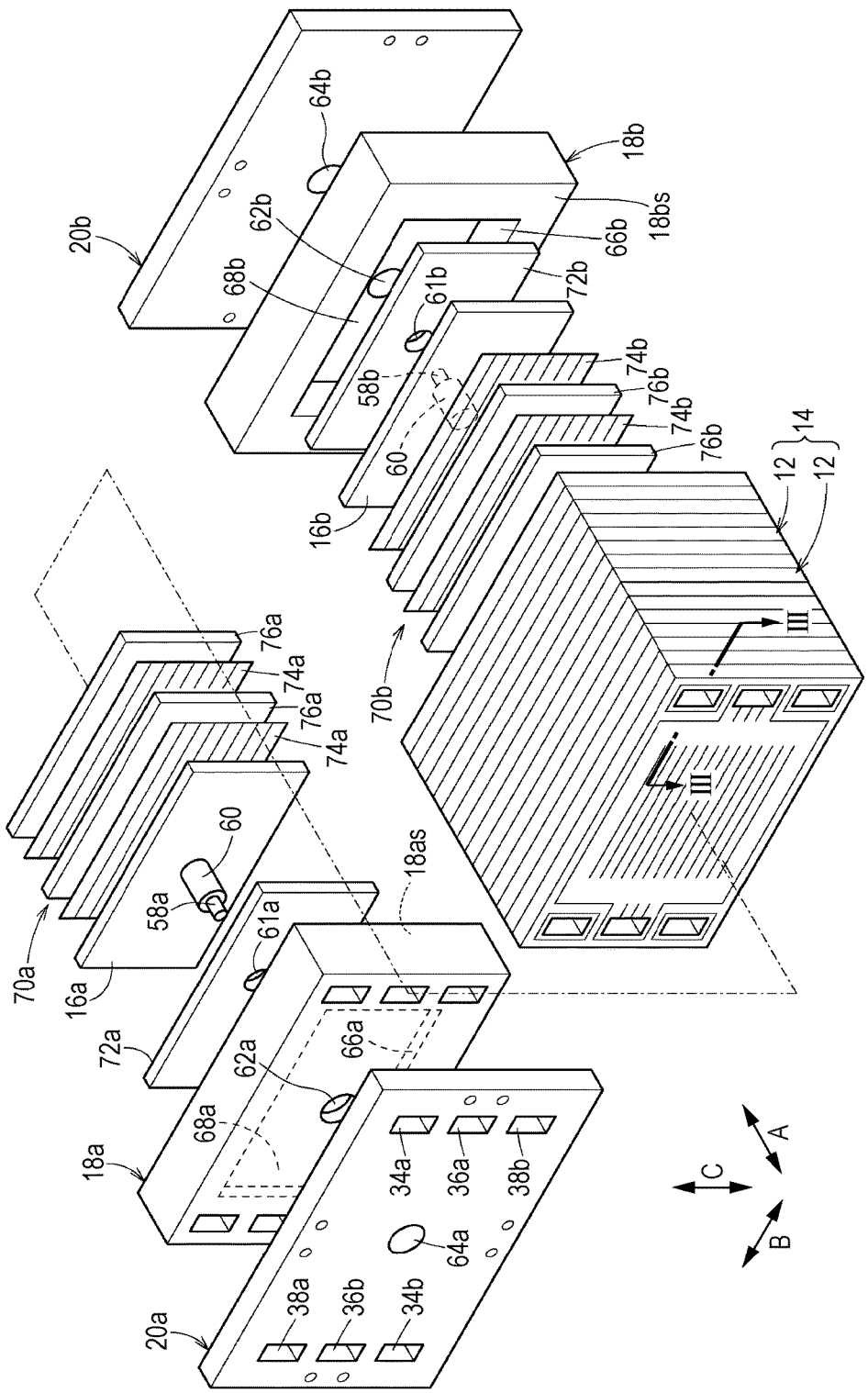
FIG. 2 is a partially exploded schematic perspective view of the fuel cell stack.

As illustrated in FIGS. 1 and 2, a fuel cell stack 10 according to a first embodiment of the present disclosure includes a stacked body 14 in which a plurality of power generation cells 12 are stacked in a stacking direction, which is a horizontal direction (direction of arrow A). Alternatively, the stacking direction may be the direction of gravity (direction of arrow C).

At one end of the stacked body 14 in the stacking direction (direction of arrow A), a terminal plate 16a, an insulator (insulation plate) 18a, and an end plate 20a are arranged outward in this order (see FIG. 2). At the other end of the stacked body 14 in the stacking direction, a terminal plate 16b, an insulator (insulation plate) 18b, and an end plate 20b are stacked outward in this order.

As illustrated in FIG. 1, the end plates 20a and 20b each have a horizontally elongated (or vertically elongated) rectangular shape. Connection bars 24 are disposed between corresponding end portions of the end plates 20a and 20b. Ends of the connection bars 24 are fixed to the inner surfaces of the end plates 20a and 20b with bolts 26 so as to apply a fastening load to the stack of the power generation cells 12 in the stacking direction (direction of arrow A). The fuel cell stack 10 may have a housing, which includes the end plates 20a and 20b, and the stacked body 14 may be disposed in the housing.

Figure 3:
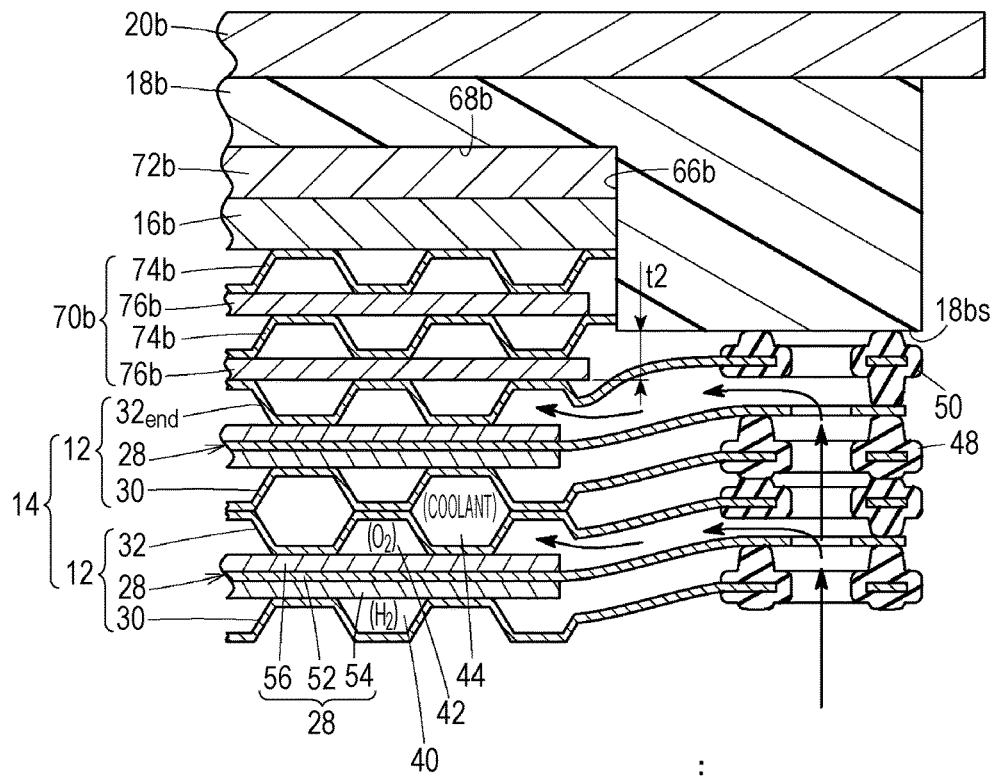
FIG. 3 is a sectional view of the fuel cell stack taken along line of FIG. 2.
Figure 3:
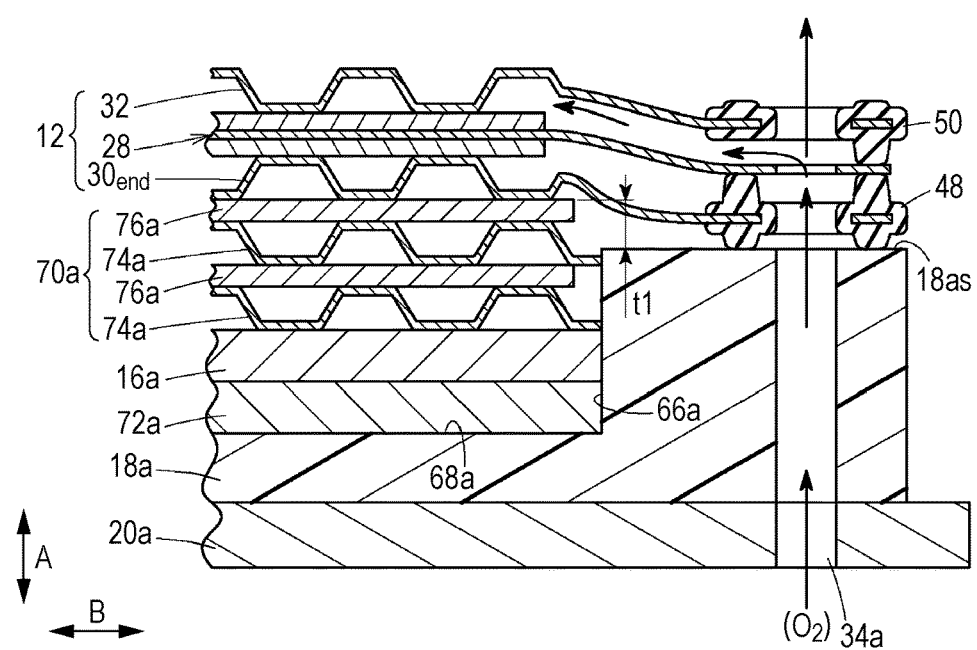
Figure 4:
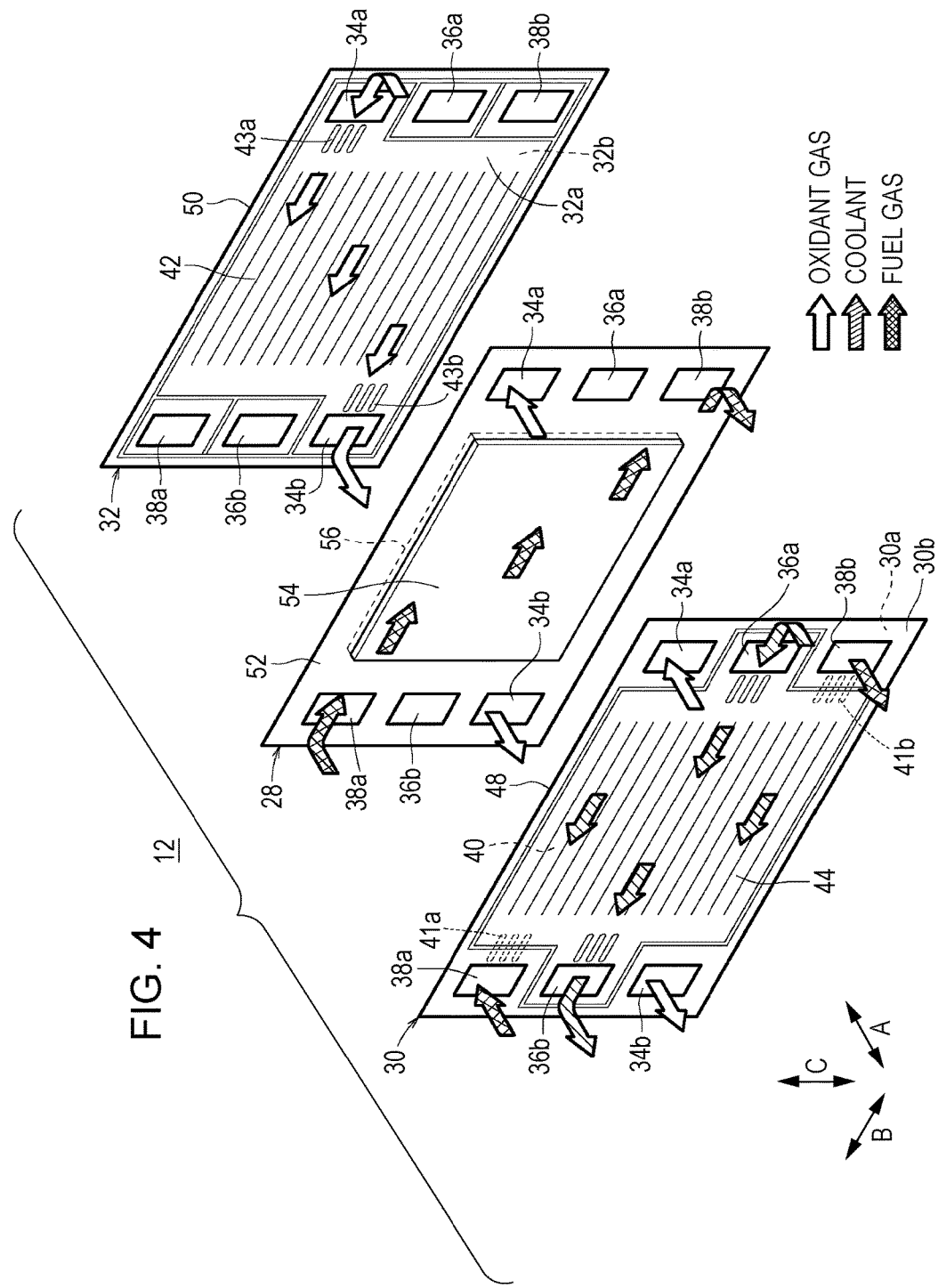
FIG. 4 is an exploded perspective view of a power generation cell included in the fuel cell stack.

As illustrated in FIGS. 3 and 4, in each power generation cell 12, a membrane electrode assembly 28 is sandwiched between a first separator 30 and a second separator 32. Each of the first separator 30 and the second separator 32 is made by press-forming a thin metal plate so as to have a corrugated shape. The thin metal plate is, for example, a steel plate, a stainless steel plate, an aluminum plate, a galvanized steel plate, or the like, which may be coated with an anti-corrosive coating. Instead of metal separators, for example, carbon separators may be used as the first separator 30 and the second separator 32.

An oxidant gas inlet manifold 34a, a coolant inlet manifold 36a, and a fuel gas outlet manifold 38b are formed in the power generation cells 12 so as to extend in the direction of arrow A through one end portion of each of the power generation cells 12 in the direction of arrow B, which is the longitudinal direction of each power generation cell 12 (a horizontal direction in FIG. 4). The oxidant gas inlet manifold 34a, the coolant inlet manifold 36a, and the fuel gas outlet manifold 38b are arranged in the direction of arrow C. An oxidant gas, such as an oxygen-containing gas, is supplied through the oxidant gas inlet manifold 34a. A coolant is supplied through the coolant inlet manifold 36a. A fuel gas, such as a hydrogen-containing gas, is discharged through the fuel gas outlet manifold 38b.

A fuel gas inlet manifold 38a, a coolant outlet manifold 36b, and an oxidant gas outlet manifold 34b are formed in the power generation cells 12 so as to extend in the direction of arrow A through the other end portion of each of the power generation cells 12 in the direction of arrow B. The fuel gas inlet manifold 38a, the coolant outlet manifold 36b, and the oxidant gas outlet manifold 34b are arranged in the direction of arrow C. The fuel gas is supplied through the fuel gas inlet manifold 38a. The coolant is discharged through the coolant outlet manifold 36b. The oxidant gas is discharged through the oxidant gas outlet manifold 34b.

On a surface 30a of the first separator 30 facing the membrane electrode assembly 28, for example, a fuel gas channel 40 is formed so as to extend in the direction of arrow B. The fuel gas channel 40 is connected to the fuel gas inlet manifold 38a through an inlet bridge portion 41a and is connected to the fuel gas outlet manifold 38b through an outlet bridge portion 41b. The inlet bridge portion 41a includes island-shaped portions that are integrally formed with a first sealing member 48 (described below). A fuel gas inlet connection passage is formed between the island-shaped portions. Likewise, the outlet bridge portion 41b includes island-shaped portions that are integrally formed with the first sealing member 48. A fuel gas outlet connection passage is formed between the island-shaped portions.

On a surface 32a of the second separator 32 facing the membrane electrode assembly 28, for example, an oxidant gas channel 42 is formed so as to extend in the direction of arrow B. The oxidant gas channel 42 is connected to the oxidant gas inlet manifold 34a through an inlet bridge portion 43a and is connected to the oxidant gas outlet manifold 34b through an outlet bridge portion 43b. The inlet bridge portion 43a includes island-shaped portions that are integrally formed with a second sealing member 50 (described below). An oxidant gas inlet connection passage is formed between the island-shaped portions. Likewise, the outlet bridge portion 43b includes island-shaped portions that are integrally formed with the second sealing member 50. An oxidant gas outlet connection passage is formed between the island-shaped portions.

A coolant channel 44, which is connected to the coolant inlet manifold 36a and the coolant outlet manifold 36b, is formed between a surface 30b of the first separator 30 of the power generation cell 12 and a surface 32b of the second separator 32 of an adjacent power generation cell 12. The coolant channel 44 is formed between the back side of the fuel gas channel 40 formed on the first separator 30 and the back side of the oxidant gas channel 42 formed on the second separator 32.

As illustrated in FIGS. 3 and 4, the first sealing member 48 is integrally formed on the surfaces 30a and 30b of the first separator 30 so as to surround the outer peripheral end portion of the first separator 30. The second sealing member 50 is integrally formed on the surfaces 32a and 32b of the second separator 32 so as to surround the outer peripheral end portion of the second separator 32.

The first and second sealing members 48 and 50 are each made of an elastic material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

The membrane electrode assembly 28 includes a solid polymer electrolyte membrane 52, and an anode electrode 54 and a cathode electrode 56 sandwiching the solid polymer electrolyte membrane 52 therebetween. The solid polymer electrolyte membrane 52 is, for example, a thin film that is made of a perfluorosulfonic acid copolymer and soaked with water. The solid polymer electrolyte membrane 52 has a surface area larger than that of each of the anode electrode 54 and the cathode electrode 56. The membrane electrode assembly 28 may be a so-called stepped MEA, in which the anode electrode 54 and the cathode electrode 56 have different surface areas.

The anode electrode 54 and the cathode electrode 56 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layer is disposed on each side of the solid polymer electrolyte membrane 52.

As illustrated in FIG. 2, terminal portions 58a and 58b extend outward in the stacking direction from substantially the centers of the terminal plates 16a and 16b, respectively. The terminal portions 58a and 58b are inserted into cylindrical insulators 60; respectively extend through holes 61a and 61b in shim members (a first shim, a second shim) 72a and 72b (described below), holes 62a and 62b in the insulators 18a and 18b, and holes 64a and 64b in the end plates 20a and 20b; and respectively protrude to the outside of the end plates 20a and 20b.

The insulators 18a and 18b are made of an electrically insulating material, such as polycarbonate (PC), a phenol resin, or the like. Recessed portions (a first recess, a second recess) 66a and 66b, which open toward the stacked body 14, are formed in central portions of the insulators 18a and 18b, respectively. The holes 62a and 62b are formed at substantially the centers of bottom surfaces 68a and 68b of the recessed portions 66a and 66b, respectively.

As illustrated in FIGS. 2 and 3, a heat insulating member 70a, the terminal plate 16a, and the shim member 72a for thickness adjustment are accommodated in the recessed portion 66a. The shim member 72a is disposed on the bottom surface 68a of the recessed portion 66a. A heat insulating member 70b, the terminal plate 16b, and the shim member 72b for thickness adjustment are accommodated in the recessed portion 66b. The shim member 72b is disposed on the bottom surface 68b of the recessed portion 66b.

The shim members 72a and 72b are made of, for example, polyphenylene sulfide (PPS), stainless steel (SUS), aluminum, copper, or the like. Preferably, the shim members 72a and 72b are made of an electrically insulating material or a material that is coated with an electrically insulating material.

The heat insulating member 70a includes first heat insulating members 74a and second heat insulating members 76a that are alternately stacked. The first heat insulating member 74a is, for example, a corrugated metal plate that is made by cutting away a frame-shaped outer peripheral portion from the first separator 30 or the second separator 32 of the power generation cell 12. The second heat insulating member 76a is, for example, a flat carbon plate. The outside dimensions of each of the first heat insulating member 74a and the second heat insulating member 76a are approximately the same as those of the inside dimensions of the recessed portion 66a of the insulator 18a. The second heat insulating member 76a may be made from the same material as the first heat insulating member 74a.

The heat insulating member 70b has the same structure as the heat insulating member 70a. Elements of the heat insulating member 70b that are the same as those of the heat insulating member 70a will be denoted by attaching "b" to the same numerals and detailed descriptions of such elements will be omitted.

As illustrated in FIG. 3, the first sealing member 48 of one of the first separators 30 (hereinafter, referred to as a "first end separator $30_{end}$") that is disposed at an end, in the stacking direction, of the stacked body 14 adjacent to the insulator 18a is in contact with a frame-shaped end surface 18as of the insulator 18a. The second sealing member 50 of one of the second separators 32 (hereinafter, referred to as a "second end separator $32_{end}$") that is disposed at an end, in the stacking direction, of the stacked body 14 adjacent to the insulator 18b is in contact with a frame-shaped end surface 18bs of the insulator 18b.

Figure 5:
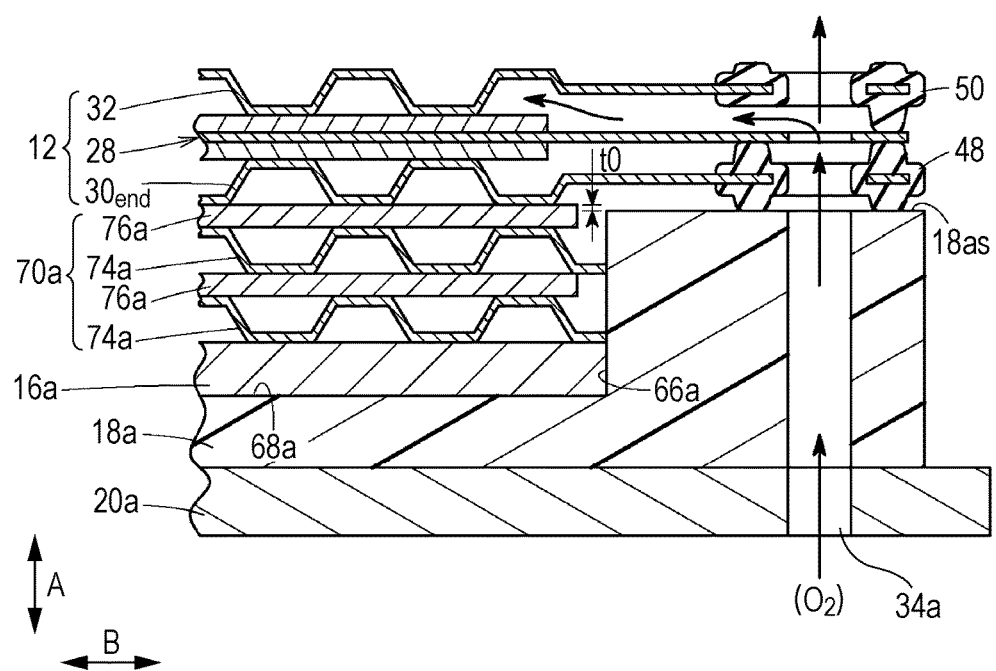
FIG. 5 is a sectional view of a fuel cell stack as a comparative example.

In the first embodiment, in a state in which an outer peripheral portion (the first sealing member 48) of the first end separator $30_{end}$ is in contact with the insulator 18a, a central portion (power generation region) of the first end separator $30_{end}$ protrudes from the outer peripheral portion inward in the stacking direction of the stacked body 14 by a distance t1. To be specific, in a case where the shim member 72a is not used, as in a reference fuel cell stack 10ref illustrated in FIG. 5, a central portion of the first end separator $30_{end}$ protrudes by a distance t0. The thickness of the shim member 72a is set so as to adjust the difference Δt (t1−t0) between the distance t1 and the distance t0.

Likewise, in a state in which an outer peripheral portion (the second sealing member 50) of the second end separator $32_{end}$ is in contact with the insulator 18b, a central portion (power generation region) of the second end separator $32_{end}$ protrudes from the outer peripheral portion inward in the stacking direction of the stacked body 14 by a distance t2. The thickness of the shim member 72b is set so as to adjust the difference Δt between the distance t2 and a corresponding distance in a case where the central portion does not protrude.

Hereinafter, an operation of the fuel cell stack 10 having such a structure will be described.

First, as illustrated in FIG. 1, an oxidant gas, such as an oxygen-containing gas, is supplied to the oxidant gas inlet manifold 34a of the end plate 20a. A fuel gas, such as a hydrogen-containing gas, is supplied to the fuel gas inlet manifold 38a of the end plate 20a. A coolant, such as pure water, ethylene glycol, or oil, is supplied to the coolant inlet manifold 36a of the end plate 20a.

As illustrated in FIG. 4, the oxidant gas flows from the oxidant gas inlet manifold 34a into the oxidant gas channel 42 of the second separator 32. The oxidant gas flows along the oxidant gas channel 42 in the direction of arrow B and is supplied to the cathode electrode 56 of the membrane electrode assembly 28.

The fuel gas flows from the fuel gas inlet manifold 38*a* into the fuel gas channel 40 of the first separator 30. The fuel gas flows along the fuel gas channel 40 in the direction of arrow B and is supplied to the anode electrode 54 of the membrane electrode assembly 28.

Accordingly, in each membrane electrode assembly 28, the oxidant gas supplied to the cathode electrode 56 and the fuel gas supplied to the anode electrode 54 are consumed in electrochemical reactions in the electrode catalyst layers. As a result, electric power is generated.

Next, the oxidant gas, which has been supplied to the cathode electrode 56 and consumed, is discharged along the oxidant gas outlet manifold 34*b* in the direction of arrow A. Likewise, the fuel gas, which has been supplied to the anode electrode 54 and consumed, is discharged along the fuel gas outlet manifold 38*b* in the direction of arrow A.

The coolant, which has been supplied to the coolant inlet manifold 36*a*, flows into the coolant channel 44 between the first separator 30 and the second separator 32, and then flows along the coolant channel 44 in the direction of arrow B. The coolant cools the membrane electrode assembly 28 and is discharged from the coolant outlet manifold 36*b*.

As illustrated in FIG. 3, in the first embodiment, the outer peripheral portion (the first sealing member 48) of the first end separator 30$_{end}$ is in contact with the insulator 18*a*. In this state, the central portion (power generation region) of the first end separator 30$_{end}$ protrudes from the outer peripheral portion inward in the stacking direction of the stacked body 14 by the distance t1.

A fastening load that is applied to the fuel cell stack 10 in the stacking direction is the sum of an electrode load that acts on the anode electrode 54 and the cathode electrode 56 and a sealing load that acts on the first sealing member 48 and the second sealing member 50. Therefore, as the central portion of the first end separator 30$_{end}$ protrudes inward in the stacking direction, the electrode load is increased while the sealing load is reduced. Accordingly, compressive deformation of the first sealing member 48 is reduced, and the cross-sectional area of fuel gas connection passages of the inlet bridge portion 41*a* and the outlet bridge portion 41*b* that are formed between the first end separator 30$_{end}$ and the membrane electrode assembly 28 is made larger than the cross-sectional area of fuel gas connection passages of another of the first separators 30.

Accordingly, the flow rate of the fuel gas that flows through the inlet bridge portion 41*a* and the outlet bridge portion 41*b* between the first end separator 30$_{end}$ and the membrane electrode assembly 28 is increased. Thus, in particular, generated water that is retained on the first end separator 30$_{end}$, which tends to be cooled more easily than other members due to dissipation of heat or the like, can be discharged easily and rapidly.

Likewise, the outer peripheral portion (the second sealing member 50) of the second end separator 32$_{end}$ is in contact with the insulator 18*b*. In this state, the central portion (power generation region) of the second end separator 32$_{end}$ protrudes from the outer peripheral portion inward in the stacking direction of the stacked body 14 by the distance t2.

Therefore, as the central portion of the second end separator 32$_{end}$ protrudes inward in the stacking direction, the electrode load is increased while the sealing load is reduced. Accordingly, compressive deformation of the second sealing member 50 is reduced, and the cross-sectional area of oxidant gas connection passages in the inlet bridge portion 43*a* and the outlet bridge portion 43*b* that are formed between the second end separator 32$_{end}$ and the membrane electrode assembly 28 is made larger than the cross-sectional area of oxidant gas connection passages of another of the second separators 32.

Accordingly, the flow rate of the oxidant gas that flows through the inlet bridge portion 43*a* and the outlet bridge portion 43*b* between the second end separator 32$_{end}$ and the membrane electrode assembly 28 is increased. Thus, in particular, generated water that is retained on the second end separator 32$_{end}$, which tends to be cooled more easily than other members due to dissipation of heat or the like, can be discharged easily and rapidly.

Therefore, the first embodiment has an advantage in that it is possible to maintain a good power generation performance of each of the power generation cells 12 that are disposed at both ends of the stacked body 14 with a simple and economical structure.

In the first embodiment, the insulators 18*a* and 18*b* need not have the recessed portions 66*a* and 66*b* in central portions thereof. Moreover, the heat insulating members 70*a* and 70*b* are not necessary.

Figure 6:
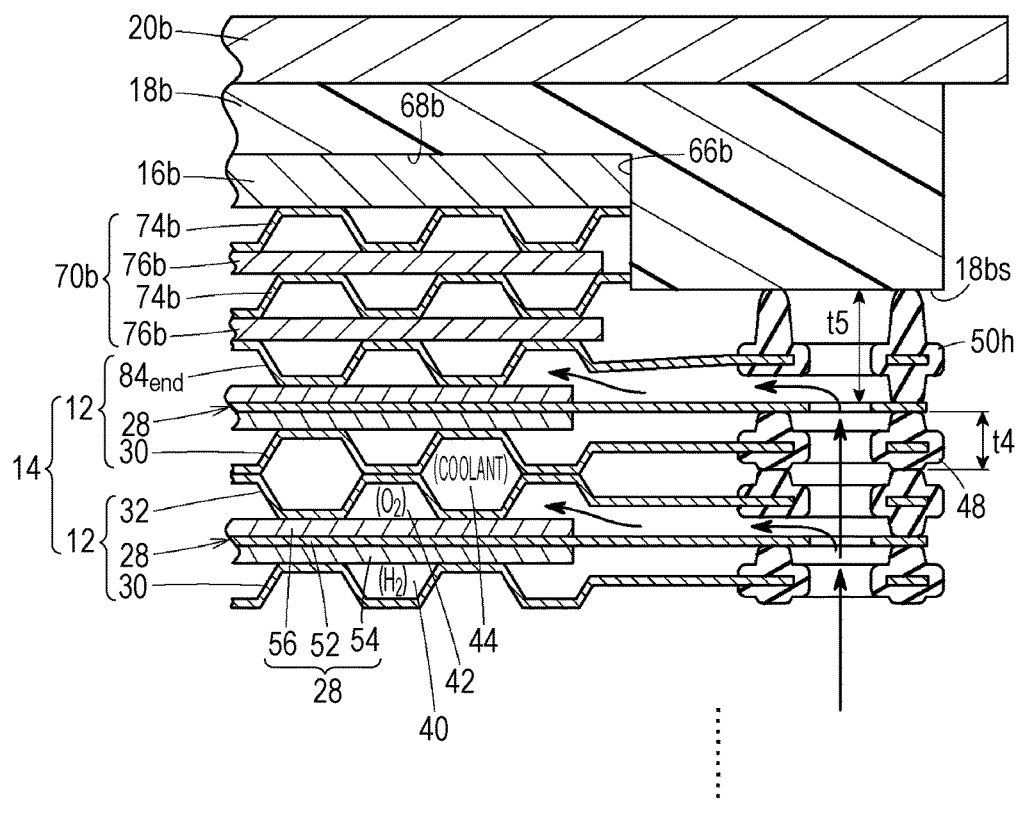
FIG. 6 is a sectional view of a fuel cell stack according to a second embodiment of the present disclosure.
Figure 6:
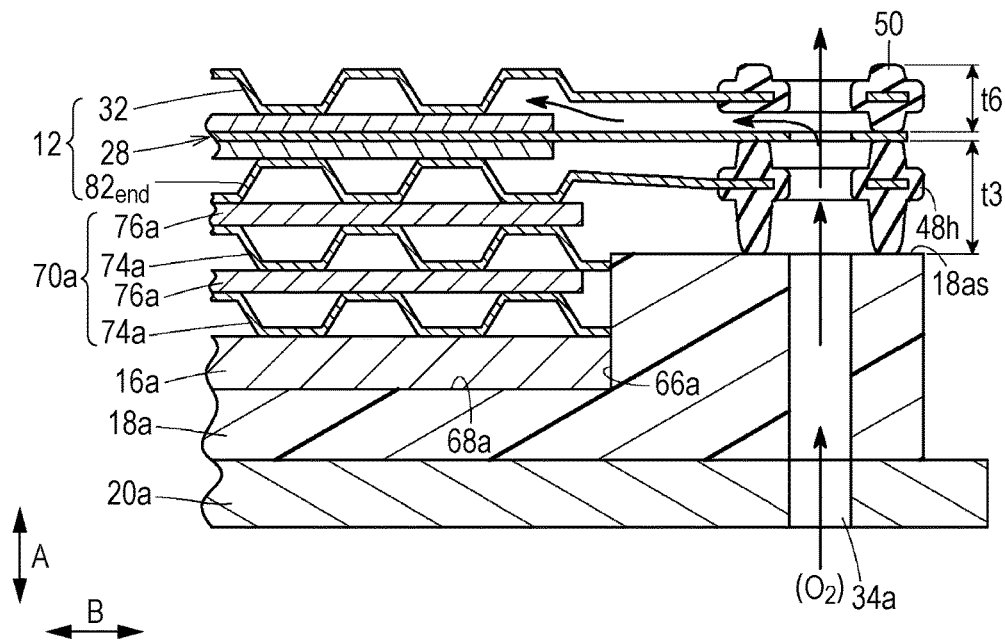

FIG. 6 is a sectional view of a fuel cell stack 80 according to a second embodiment of the present disclosure. Elements of the fuel cell stack 80 that are the same as those of the fuel cell stack 10 of the first embodiment will be denoted by the same numerals and detailed descriptions of such elements will be omitted.

The fuel cell stack 80 does not include the shim members 72*a* and 72*b*, includes a first end separator 82$_{end}$ instead of the first end separator 30$_{end}$, and includes a second end separator 84$_{end}$ instead of the second end separator 32$_{end}$.

A first sealing member 48*h* is integrally formed with the first end separator 82$_{end}$. The dimension t3 of the first sealing member 48*h* in a separator thickness direction (the direction of arrow A) is larger than the dimension t4 of the first sealing member 48, which is integrally formed with the first separator 30, in the separator thickness direction.

A second sealing member 50*h* is integrally formed with the second end separator 84$_{end}$. The dimension t5 of the second sealing member 50*h* in the separator thickness direction is larger than the dimension t6 of the second sealing member 50, which is integrally formed with the second separator 32, in the separator thickness direction.

In the second embodiment structured as described above, the dimension of the first sealing member 48*h* in the separator thickness direction is larger than that of another of the first sealing members 48. Therefore, in particular, the cross-sectional area of the fuel gas connection passages of the inlet bridge portion 41*a* and the outlet bridge portion 41*b* is made larger than that of another of the first separators 30, and the flow rate of the fuel gas is increased.

Likewise, the dimension of the second sealing member 50*h* in the separator thickness direction is larger than that of another of the second sealing members 50. Accordingly, in particular, the cross-sectional area of the oxidant gas connection passages of the inlet bridge portion 43*a* and the outlet bridge portion 43*b* is made larger than that of another of the second separators 32, and the flow rate of the oxidant gas is increased. Thus, with the second embodiment, the same advantage as the first embodiment can be obtained.

According to a first aspect of the present disclosure, a fuel cell stack includes a stacked body in which a plurality of power generation cells, each including an electrolyte-electrode assembly and a separator, are stacked in a stacking direction, each electrolyte-electrode assembly including an electrolyte and electrodes disposed on both sides of the electrolyte. The separators include end separators that are disposed at both ends of the stacked body in the stacking direction. A terminal plate, an insulator, and an end plate are disposed outside of each end separator.

Each insulator has a recessed portion that opens toward the stacked body, and a heat insulating member, the terminal plate, and a shim member for thickness adjustment are accommodated in the recessed portion. A thickness of the shim member is set so that, in a state in which an outer peripheral portion of the end separator is in contact with the insulator, a central portion of the end separator protrudes from the outer peripheral portion inward in the stacking direction of the stacked body.

In the fuel cell stack, preferably, an oxidant gas manifold, through which an oxidant gas flows, and a fuel gas manifold, through which a fuel gas flows, are formed in the separator so as to extend through the stacked body in the stacking direction. In this case, preferably, the oxidant gas manifold and the fuel gas manifold are formed in the insulator.

According to a second aspect of the present disclosure, a shim member for thickness adjustment is disposed on each insulator so that, in a state in which an outer peripheral portion of the end separator is in contact with the insulator, a central portion of the end separator protrudes from the outer peripheral portion inward in the stacking direction of the stacked body.

According to a third aspect of the present disclosure, a dimension, in a separator thickness direction, of a sealing member that is integrally formed with each end separator is larger than a dimension, in the separator thickness direction, of the sealing member that is integrally formed with another of the separators.

With the present disclosure, in a state in which an outer peripheral portion of the end separator is in contact with the insulator, a central portion of the end separator protrudes from the outer peripheral portion inward in the stacking direction of the stacked body. A fastening load applied to the fuel cell stack in the stacking direction is the sum of an electrode load that acts on the electrodes and a sealing load that acts on the sealing member. Therefore, as the central portion of the end separator protrudes inward in the stacking direction, the electrode load is increased while the sealing load is reduced. Accordingly, compressive deformation of the sealing member is reduced, and the cross-sectional area of a reactant gas connection passage (so-called bridge portion) that is formed between the end separator and the electrolyte-electrode assembly is increased.

Thus, the flow rate of a reactant gas (an oxidant gas or a fuel gas) that flows through the reactant gas connection passage between the end separator and the electrolyte-electrode assembly is increased, and generated water can be discharged easily and rapidly. Therefore, it is possible to maintain a good power generation performance of the end cell with a simple and economical structure.

Obviously, numerous modifications and variations of the present invention are possible in light of the above teachings. It is therefore to be understood that within the scope of the appended claims, the invention may be practiced otherwise than as specifically described herein.

What is claimed is:
1. A fuel cell stack comprising:
   a stacked body having a first end and a second end opposite to the first end in a stacking direction and comprising:
      electrolyte-electrode assemblies stacked in the stacking direction and having a first end electrolyte-electrode assembly disposed at the first end of the stacked body, each of the electrolyte-electrode assemblies comprising:
         an electrolyte having a first side and a second side opposite to the first side in the stacking direction;
         a first electrode disposed on the first side; and
         a second electrode disposed on the second side; and
      separators provided so that each of the electrolyte-electrode assemblies is sandwiched between two separators among the separators in the stacking direction, the separators including a first end separator disposed at the first end of the stacked body between the first end electrolyte-electrode assembly and a first contact end plate having a first contact surface which the first end separator contacts;
   a first insulator opposed to the first contact end plate and having a first recess opposed to the first contact end plate, an outer peripheral surface of the first end separator being connected to an outer peripheral surface of the first insulator; and
   a first shim provided in the first recess between the first end separator and the first insulator, the first shim having a thickness such that the outer peripheral surface of the first end separator is positioned closer to the first contact surface of the first contact end plate than a central portion of the first end separator in the stacking direction.

2. The fuel cell stack according to claim 1,
wherein an oxidant gas manifold through which an oxidant gas flows and a fuel gas manifold through which a fuel gas flows are provided in the separators so as to extend through the stacked body in the stacking direction, and
wherein the oxidant gas manifold and the fuel gas manifold are provided in the first insulator.

3. The fuel cell stack according to claim 1,
wherein the first contact end plate comprises a heat insulating member and provided in the first recess,
wherein a first terminal plate is provided in the first recess between the first contact end plate and the first shim, and
wherein a first end plate is provided on the first insulator so that the first insulator is sandwiched between the first shim and the first end plate in the stacking direction.

4. The fuel cell stack according to claim 1, further comprising:
   a second insulator; and
   a second shim,
wherein the electrolyte-electrode assemblies have a second end electrolyte-electrode assembly disposed at the second end of the stacked body,
wherein the separators include a second end separator disposed at the second end of the stacked body between the second end electrolyte-electrode assembly and a second contact end plate having a second contact surface which the second end separator contacts,
wherein the second insulator is opposed to the second contact end plate and has a second recess opposed to the second contact end plate,
wherein an outer peripheral surface of the second end separator is connected to an outer peripheral surface of the second insulator, and
wherein the second shim is provided in the second recess between the second end separator and the second insulator, the second shim has a thickness such that the outer peripheral surface of the second end separator is positioned closer to the second contact surface of the second contact end plate than a central portion of the first end separator in the stacking direction.

5. The fuel cell stack according to claim 1,
wherein the thickness of the first shim is such that the outer peripheral surface of the first end separator is positioned closer to the first contact surface of the first contact end plate than an entirety of the central portion of the first end separator in the stacking direction.

6. A fuel cell stack comprising:
a stacked body having a first end and a second end opposite to the first end in a stacking direction and comprising:
   electrolyte-electrode assemblies stacked in the stacking direction and having a first end electrolyte-electrode assembly disposed at the first end of the stacked body, each of the electrolyte-electrode assemblies comprising:
      an electrolyte having a first side and a second side opposite to the first side in the stacking direction;
      a first electrode disposed on the first side; and
      a second electrode disposed on the second side; and
   separators provided so that each of the electrolyte-electrode assemblies is sandwiched between two separators among the separators in the stacking direction, the separators including a first end separator disposed at the first end of the stacked body between the first end electrolyte-electrode assembly and a first contact end plate having a first contact surface which the first end separator contacts;
a first insulator opposed to the first contact end plate, an outer peripheral surface of the first end separator being connected to an outer peripheral surface of the first insulator; and
a first shim provided between the first end separator and the first insulator so that the outer peripheral surface of the first end separator is positioned closer to the first contact surface of the first contact end plate than a central portion of the first end separator in the stacking direction.

7. The fuel cell stack according to claim 6,
wherein the first contact end plate comprises a heat insulating member,
wherein a first terminal plate is provided between the first contact end plate and the first shim, and
wherein a first end plate is provided on the first insulator so that the first insulator is sandwiched between the first shim and the first end plate in the stacking direction.

8. The fuel cell stack according to claim 6, further comprising:
a second insulator; and
a second shim,
wherein the electrolyte-electrode assemblies have a second end electrolyte-electrode assembly disposed at the second end of the stacked body,
wherein the separators include a second end separator disposed at the second end of the stacked body between the second end electrolyte-electrode assembly and a second contact end plate having a second contact surface which the second end separator contacts,
wherein the second insulator is opposed to the second contact end plate,
wherein an outer peripheral surface of the second end separator is connected to an outer peripheral surface of the second insulator the outer peripheral surface of, and
wherein the second shim is provided between the second end separator and the second insulator so that the outer peripheral surface of the second end separator is positioned closer to the second contact surface of the second contact end plate than a central portion of the first end separator in the stacking direction.

9. The fuel cell stack according to claim 6,
wherein a thickness of the first shim is such that the outer peripheral surface of the first end separator is positioned closer to the first contact surface of the first contact end plate than an entirety of the central portion of the first end separator in the stacking direction.

\* \* \* \* \*